March 19, 1935.    R. B. HUNTER    1,994,821
ELECTRIC MOTOR CONTROL APPARATUS
Filed Oct. 3, 1932
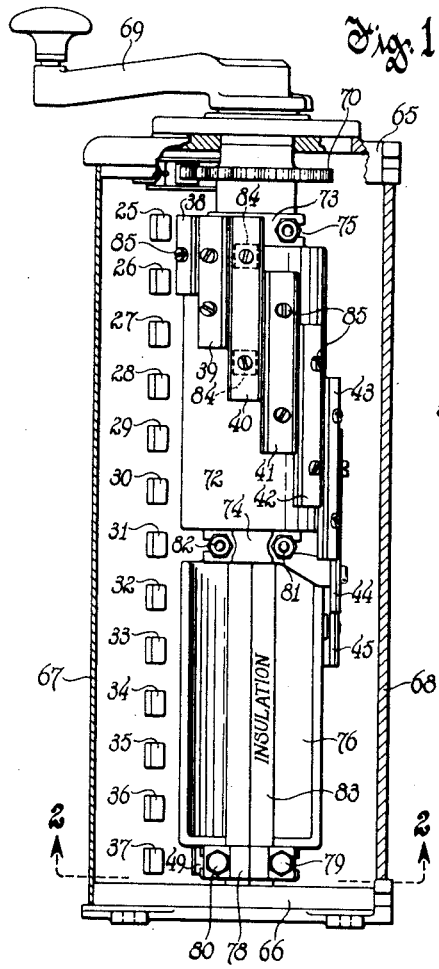
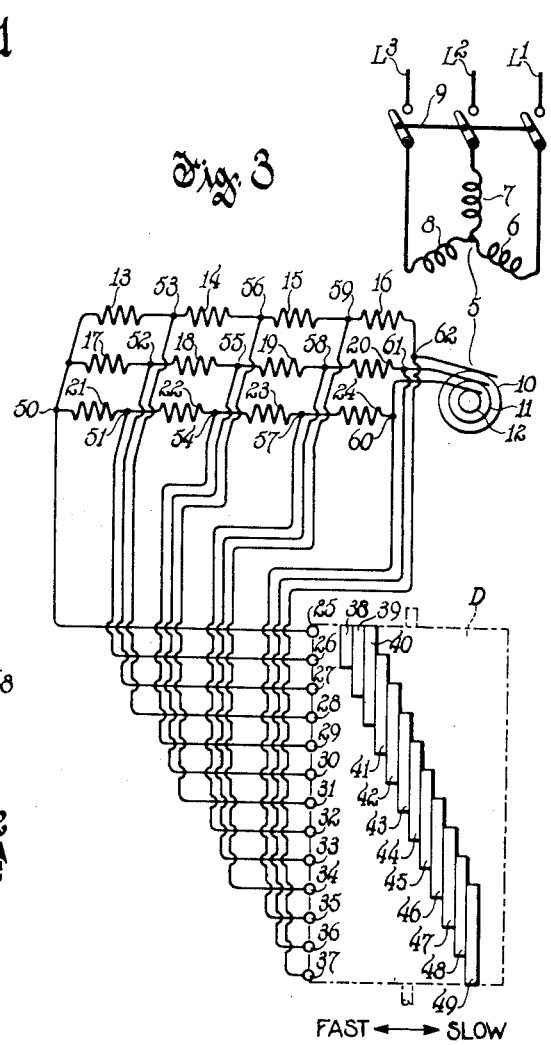
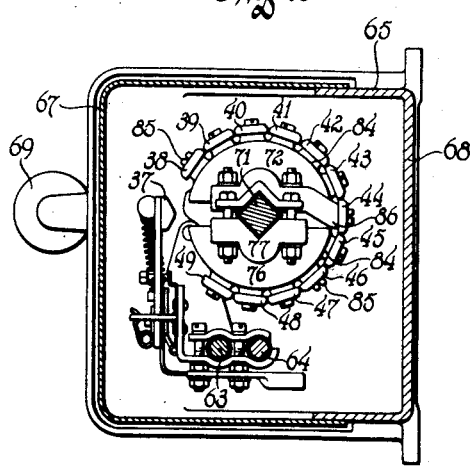
Inventor
Richard B. Hunter
By Frank H. Hubbard
Attorney Patented Mar. 19, 1935

1,994,821

UNITED STATES PATENT OFFICE 1,994,821

ELECTRIC MOTOR CONTROL APPARATUS

Richard B. Hunter, Shorewood, Wis., assignor to Cutler-Hammer, Inc., Milwaukee, Wis., a corporation of Delaware Application October 3, 1932, Serial No. 635,966

13 Claims. (Cl. 172—179)

This invention relates to improvements in electric motor control apparatus, and more particularly to control apparatus of the drum type.

An object of the invention is to improve the details of construction and assembly of the parts and the operation of control apparatus of the character aforementioned.

Another and more specific object is to provide a novel form and arrangement of the drum segments.

Another object is to provide a control drum having a novel arrangement of the stationary and movable parts thereof together with a novel arrangement of circuits to be controlled thereby.

Another object is to provide a novel form of rotatable support for the segments aforementioned.

Another object is to provide a speed controlling drum for polyphase induction motors in which the drum segments are of simple and inexpensive form and adapted for ready attachment and detachment independently of each other to facilitate assembly and/or repair of the complete device.

Another object is to permit use of segments of strip form,—a minimum number of lengths of segments being standard for control apparatus of different forms.

Another object is to provide a control drum having segments of the aforementioned character to minimize the number of electrical joints and the total length of current path through the drum in each operative position of the latter.

Other objects and advantages of the invention will hereinafter appear.

The accompanying drawing illustrates an embodiment of the invention which will now be described, it being understood that the embodiment illustrated is susceptible of modification in certain details thereof without departing from the scope of the appended claims.

In the drawing, Figure 1 is a side elevational view of a control drum constructed in accordance with my invention, the drum casing being shown in section, and certain parts of the contact fingers being omitted for simplicity of illustration.

Fig. 2 is a sectional view, on the line 2—2 of Fig. 1, and

Fig. 3 illustrates an adaptation of my improved drum for speed control of a polyphase induction motor.

Referring first to Fig. 3, the numeral 5 designates a polyphase induction motor the stator windings 6, 7 and 8 of which are adapted to be connected to a suitable source of energy supply, represented by lines $L^1$, $L^2$ and $L^3$, upon closure of the contacts of a switch 9 which may be operable in any well known manner. The polyphase rotor has windings connected, through slip rings 10, 11 and 12, in star relation to each other,—each phase of the rotor having initially connected in series therewith a plurality of resistance sections 13 to 16, 17 to 20, and 21 to 24, inclusive, of the polyphase resistor.

The control drum is provided with a multiplicity of contact fingers 25 to 37, inclusive, the number of which corresponds with the number of speeds desired for the motor,—thirteen in the present case. The control drum is also provided with a multiplicity of bridging segments 38 to 49, inclusive,—the number thereof being one less than the number of contact fingers. The development of said drum is designated by the reference character D in Fig. 3.

Contact finger 25 is connected as shown to the common or star-point 50 of the polyphase resistor, and the contact fingers 26 to 37 are connected respectively to the taps 51 to 62 in said resistor. Assuming closure of switch 9 and neutral positioning of drum D the circuit of motor 5 will be completed and the same will operate at a relatively slow speed due to inclusion of all sections 13 to 24 of the polyphase resistor in circuit with the rotor windings. Upon movement of the drum to the first speed-changing position thereof the segment 38 will bridge contact fingers 25 and 26 thus short-circuiting the resistance section 21 in one phase of the rotor whereby the speed of motor 5 is increased to a predetermined degree.

Each of the segments 38 to 49 consists of a straight flat metal strip,—all of said segments being of like width and thickness whereby the same may be cut to the desired lengths from a single or continuous strip which may be extruded, rolled, swaged or otherwise formed in any well known manner. The longitudinal edges of the segments at the upper surfaces thereof are beveled or otherwise formed (as best illustrated in Fig. 2) to facilitate engagement thereof with the cooperating contact fingers. The form of the contact finger 37 and the supporting means therefor is shown in detail in Fig. 2,—it being understood that the other contact fingers 25 to 36 are of like form and are attached in like manner to and insulated from the supporting rods or shafts 63, 64. The form of said contact fingers and the supporting means therefor are described and claimed in Mekelburg Patent No. 1,753,016, dated April 1, 1930, and hence further description thereof herein is deemed unnecessary. It is of course to be understood that other suitable types of contact fingers may be employed if desired.

The strip-form drum segments extend lengthwise axially of the drum shaft in closely adjacent parallel relationship to each other,—the arrangement being such that the required number of contact fingers will be engaged by a given segment prior to disengagement of the last preceding drum segment from its cooperating contact fingers. Thus upon movement of the drum to its second speed-changing position the segment 39 will engage contact fingers 25, 26 and 27 just prior to disengagement of segment 38 from contact fingers 25 and 26. In this manner the resistance section 21 will be maintained short-circuited through continued bridging of contact fingers 25 and 26, and in addition the resistance section 17 will be short-circuited through bridging of contact fingers 25 and 27. The speed of motor 5 will thus be further increased to a predetermined degree.

During movement of the drum to its next speed-changing position segment 40 will engage contact fingers 25, 26, 27 and 28 prior to disengagement of segment 39 from contact fingers 25, 26 and 27. The resistance sections 21 and 17 will thus remain short-circuited, and in addition the resistance section 13 will be short-circuited through bridging of contact fingers 25 and 28, whereby the speed of the motor is further increased to a predetermined degree. Since the drum segment 40 has become the common or star-point of the polyphase resistor it is apparent that upon movement of the drum to its next speed-changing position the contact finger 25 may be entirely disengaged without danger of reincluding any one of the resistance sections 21, 17 or 13 previously excluded from circuit. On the other hand segment 41 will then bridge contact fingers 26, 27 28 and 29 to additionally short-circuit the resistance section 22 through bridging of contact fingers 26 and 29.

As will be noted the segment 38 is adapted to bridge two contact fingers, the segment 39 is adapted to bridge three contact fingers and each of the other segments 40 to 49 is adapted to bridge four contact fingers. Due to the fact that segment 40 is adapted to engage contact finger 28 prior to disengagement of segment 39 from contact finger 25 it will be apparent that segment 40 might be made of a length such as to engage only the contact fingers 26, 27 and 28 without in any way interfering with the proper control of the rotor circuit of motor 5. In like manner each of the segments 41 to 49, inclusive, could be reduced twenty-five per cent in length at the upper ends thereof respectively, whereby a substantial economy in the amount of metal required for the drum segments could be effected. Also if desired each contact finger might be provided with an auxiliary contact portion to positively insure maintenance of all circuit connections afforded by a given positioning of the drum pending completion of the circuit connections required for the next succeeding position of the drum.

In either case continued movement of the drum will operate in the manner aforeindicated to successively short-circuit the additional sections of resistance 18, 14, 23, 19, 15, 24, 20 and 16, in the order named, whereupon the entire polyphase resistor will be excluded to provide for full-speed operation of motor 5. As will be noted from the foregoing description, one section of resistance will be excluded from each phase of the polyphase resistor, in succession, prior to further exclusion of a resistance section from any one of said phases,—the same sequence being maintained throughout the entire resistance-excluding operation.

Certain of the mechanical features of the drum, as illustrated in Figs. 1 and 2, may be of more or less standard construction. Thus the drum may be provided with a casing comprising top and bottom cast metal sections 65 and 66 of known form and front and rear sheet metal sections 67 and 68 of the desired form. The drum is provided with an operating handle 69, and any well known form of spring-pressed roller and starwheel device, such as that indicated at 70 may be provided to facilitate stopping or locating of the drum in its respective speed-controlling positions.

Attached to the handle 69 and adapted to bear within the upper and lower sections 65 and 66 of the drum casing is a shaft 71 (Fig. 2) the intermediate portion, at least, of which is of rectangular or other desired polygonal cross section. Attached to the upper portion of said shaft at one side thereof is a substantially semi-cylindrical hollow metal member 72, said member having clamping lugs 73 and 74 formed at opposite ends thereof to accommodate the angled surfaces of the shaft 71,—a suitable clamping plate (not shown) being opposed to the lug 73 to provide for securement of the latter as by means of suitable bolts and nuts, one set of which is shown at 75 in Fig. 1. Arranged in end-to-end relationship to member 72 and offset with respect to the latter at an angle of one hundred and eighty degrees around shaft 71 is a second substantially semi-cylindrical hollow metal member 76, the latter having a clamping lug 77 formed at the lower end thereof for cooperation with the clamping plate 78 and bolts 79 and 80 whereby the lower end of member 76 is attached to shaft 71. The upper end of member 76 has formed integrally therewith a clamping lug (not shown) which is opposed to the lug 74 on member 72, said lugs being held in clamping engagement with shaft 71, as by means of nuts and bolts 81 and 82.

Interposed between shaft 71 and the clamping lugs of members 72 and 76 is a layer 83 of laminated fiber or other suitable insulating material, whereby said members are properly insulated from said shaft. Members 72 and 76 have bosses or raised portions formed thereon,—certain of said bosses being shown at 84 in Fig. 2, and in dotted lines in Fig. 1. Said bosses are provided with tapped openings for cooperation with the shanks of ordinary headed screws 85 which penetrate correspondingly located openings in the drum segments. As shown the securing screws for the drum segments are so located as to provide proper clearance between the same and the drum fingers. The upper member 72 aforementioned is preferably provided with a projecting arm 86 to which the lower end portion of segment 44 is attached (as shown in Fig. 1) for proper support of the latter. By spacing the segments outwardly from members 72 and 76 I insure against accidental contact of the drum fingers with said members 72 and 76. Inasmuch as the segment supporting members 72 and 76 are not required to carry any current whatsoever the same may be made of iron, or even of non-conducting material, instead of brass or aluminum as frequently required in the control drums of the prior art. Moreover, by eliminating the necessity for employment of segment supporting members or spiders through which the electric current is intended to flow,—I insure better electrical connections between the several parts of the controlled circuits.

By forming and attaching the drum segments in the manner herein described I facilitate assembly and/or repair of the complete device,— it being obvious that any worn or defective segment may be removed and replaced by a new segment with a minimum loss of time and without disturbing the other parts of the device. The segments herein disclosed are considerably less expensive than the conventional drum segments inasmuch as the former do not require forming or bending. Also as aforeindicated the segments disclosed by me are so arranged that the same may be attached to the support-members by standard screws and lock washers,—the screw heads being located in spaces between the contact fingers. In control drums of known form, on the other hand, the segments are required to be provided with special countersunk passages to accommodate the heads of specially formed screws,— which screw heads in turn tend to impair the perfection of electrical contact between the segments and contact fingers of the drum.

What I claim as new and desire to secure by Letters Patent is:

1. In combination, an induction motor having a polyphase rotor, a polyphase resistor connected in star relation in series with said rotor, a speed controller for said motor, said controller comprising a plurality of stationary contacts connected to taps on said resistor, all adjacent contacts being respectively connected to different phases of said resistor, a fixed supporting shaft for said contacts, a rotatable member, resistor-commutating means mounted on said rotatable member, said means comprising a plurality of rectangular-parallelepipedal-shaped segments, and means for rotating said member so that each adjacent segment successively and individually bridges a plurality of adjacent stationary contacts, certain of said stationary contacts being sequentially engaged by a plurality of adjacent segments.

2. In combination, an electric motor having a polyphase rotor, a polyphase resistor connected in star relation in series with said rotor, a speed controller for said motor, said controller comprising a plurality of stationary contacts connected to taps on said resistor, all adjacent contacts being respectively connected to different phases of said resistor, a fixed supporting shaft for said contacts, a rotatable member, resistor-commutating means mounted on said rotatable member, said means comprising a plurality of rectangular-parallelepipedal-shaped segments, and means for rotating said member so that each adjacent segment successively and individually bridges a plurality of adjacent stationary contacts, certain of said stationary contacts being sequentially engaged by a number of adjacent segments, said number being equal to or greater than the number of phases in said motor.

3. In combination, an electric motor having a polyphase rotor, a polyphase resistor connected in star relation in series with said rotor, a speed controller for said motor, said controller comprising a plurality of stationary contacts connected to taps on said resistor, all adjacent contacts being respectively connected to different phases of said resistor, a fixed supporting shaft for said contacts, a rotatable member, resistor-commutating means mounted on said rotatable member, said means comprising a plurality of rectangular-parallelepipedal-shaped segments, means for rotating said member so that each adjacent segment successively and individually bridges a plurality of adjacent stationary contacts, certain of said stationary contacts being sequentially engaged by a number of adjacent segments, said number being equal to or greater than the number of phases in said rotor, said segments extending lengthwise axially of said rotatable member in closely adjacent parallel relationship to each other, and means for individually and removably attaching said segments to said rotatable member.

4. In combination, an electric motor having a polyphase rotor, a polyphase resistor connected in star relation in series with said rotor, means for controlling the speed of said motor, said means comprising a plurality of contacts connected to taps on said resistor, all adjacent contacts being respectively connected to different phases of said resistor, a fixed support for said contacts, a member rotatable with respect to said contacts, and resistor-commutating means mounted on said member, said last-mentioned means comprising a plurality of metal-strip segments of rectangular-parallelepipedal contour, said segments extending lengthwise axially of said rotatable member and being arranged in close proximity to each other circumferentially of said member, the adjacent segments being adapted to successively and individually bridge a plurality of adjacent stationary contacts, whereby said resistor may be commutated in a step-by-step manner and successively with respect to the different phases thereof.

5. The combination with an induction motor having a polyphase rotor, a polyphase resistor connected in star relation in series with said rotor, a plurality of taps in each phase of said resistor and a tap at the common point thereof, a multiplicity of fixed drum contacts to which said taps are respectively connected, all adjacent contacts being connected to different phases respectively of said resistor, a drum cylinder rotatable with respect to said fixed contacts, and resistor-commutating means mounted on said cylinder, said last-mentioned means comprising a multiplicity of closely adjacent strip metal segments one less in number than the number of speeds to be afforded by commutation of said polyphase resistor, all of said segments being of equal width and the majority thereof being of equal length, said length of the latter segments being sufficient to afford bridging thereby of a number of fixed contacts equal to or greater than the number of phases in said rotor to insure against transient re-inclusion of any section of resistance during resistance-excluding operation of said drum.

6. The combination with an induction motor having a polyphase rotor, resistances connected in series with each phase of said rotor, said resistances having a common star connection, a multiplicity of taps respectively dividing said resistances into sections of predetermined value, a control drum having a multiplicity of contact fingers corresponding in number to the number of speeds to be afforded by commutation of said polyphase resistor, one of said contact fingers being connected to the star-point of said resistor and the other contact fingers being respectively connected to said taps, all of the adjacent contact fingers last-mentioned being connected to different phases respectively of said resistor, said drum having a multiplicity of segments one less in number than the number of speeds to be provided, one of said segments being adapted to bridge two of said contact fingers to short-circuit one section of resistance, the next succeeding segment being adapted to bridge an additional contact finger to also short-circuit a section of resistance in another phase of said rotor, and so on until all sections of resistance have been short-circuited, all of the segments after short-circuiting of one section of resistance in each phase being of sufficient length to bridge a number of contact fingers exceeding by one the number of phases in said rotor, said last-mentioned segments being of equal length, and all of the segments being of equal width.

7. The combination with an induction motor having a polyphase rotor, resistances connected in series with each phase of said rotor, said resistances having a common star connection, a multiplicity of taps respectively dividing said resistances into sections of predetermined value, a control drum having a multiplicity of contact fingers corresponding in number to the number of speeds to be afforded by commutation of said polyphase resistor, one of said contact fingers being connected to the star-point of said resistor and the other contact fingers being respectively connected to said taps, all of the adjacent contact fingers last-mentioned being connected to different phases respectively of said resistor, said drum having a multiplicity of segments one less in number than the number of speeds to be provided, one of said segments being adapted to bridge two of said contact fingers to short-circuit one section of resistance, the next succeeding segment being adapted to bridge said two contact fingers and an additional contact finger to also short-circuit a section of resistance in another phase of said rotor, and so on until all sections of resistance have been short-circuited, all of the segments after short-circuiting of one section of resistance in each phase being of sufficient length to bridge a number of contact fingers exceeding by one the number of phases in said rotor, said last-mentioned segments being of equal length, and all of the segments being of equal width, said segments being individually and removably attachable to said drum whereby the time and expense of repair of the latter is minimized.

8. In combination, an electric motor having a polyphase rotor, a polyphase resistor comprising a plurality of resistances of substantially equal value connected in star relation in series with said rotor, a multiplicity of taps for dividing the resistances in the respective phases into sections of corresponding values, a control drum having a multiplicity of contact fingers corresponding in number to the number of speeds desired for said motor, one of said contact fingers being connected to the star-point of said resistor and the other contact fingers being respectively connected to said taps, the arrangement being such that all adjacent contact fingers are respectively connected to different phases of said resistor, said control drum also having a multiplicity of segments one less in number than the number of said contact fingers, said segments being of like width and being positioned lengthwise axially of said drum in side by side relationship to each other, one of said segments being adapted to bridge two of said contact fingers whereby a section of resistance in one of said phases is short-circuited, the next succeeding segment being adapted to bridge said two contact fingers and an additional contact finger whereby a section of resistance in another phase is also short-circuited, the next succeeding segment being adapted to bridge said three contact fingers and an additional contact finger whereby a section of resistance in still another phase is short-circuited, each succeeding segment being adapted to bridge a group of contact fingers the number of which is not less than the number of phases in said rotor and each succeeding group including one contact finger not included in the preceding groups, whereby all of said resistance sections may be finally short-circuited.

9. In a control durm of the character described, in combination, a multiplicity of stationary contact fingers, a drum cylinder, a multiplicity of segments one less in number than the number of said contact fingers, said segments all consisting of flat metal strips of equal width and thickness, said segments extending lengthwise in closely adjacent relationship to each other axially of said cylinder, each of said segments being adapted to bridge a plurality of said contact fingers and the lower ends of the adjacent segments extending downwardly in stepped relationship to each other to provide for bridging engagement thereof with said contact fingers in sequence, one of said segments being adapted to bridge two of said contact fingers, the next adjacent segment being adapted to bridge three of said contact fingers, all of the succeeding segments being adapted to bridge at least four of said contact fingers, the majority of said segments being of equal length, and means for individually and removably attaching said segments to said drum cylinder, said means comprising screws the raised heads of which are arranged to provide clearance for said contact fingers.

10. A drum segment comprising a straight flat strip of metal, the longitudinal edges of said strip at the top face thereof being beveled to facilitate engagement thereof with drum contact fingers of suitable form, said strip having a plurality of cylindrical openings formed therein to accommodate the shanks of suitable securing screws, and said openings being so positioned as to insure clearance for the heads of said screws with respect to said contact fingers upon attachment of said strip to the rotatable supporting member of the drum.

11. In a drum controller, in combination, a rotatable supporting member, a multiplicity of drum segments, each of said segments consisting of a straight flat strip of metal, and means for individually and removably attaching said segments lengthwise to said supporting member to extend axially of the latter in closely adjacent parallel relationship to each other, the longitudinal edges of each segment at the top face thereof being beveled to facilitate engagement thereof with drum contact fingers of suitable form and to insure simultaneous engagement of adjacent segments by said contact fingers during transition from one drum position to another, said attaching means comprising screws the shanks of which are adapted to penetrate said segments respectively, the upstanding heads of said screws being arranged to provide clearance between the same and the contact fingers during operation of the drum.

12. A control device of the character described comprising a fixed support, a multiplicity of spring contact fingers carried by said support but insulated from the latter and from each other, a shaft rotatable in spaced relationship to said contact fingers, a pair of substantially semi-cylindrical support members secured to opposite sides of said shaft and arranged axially of the latter in end to end relationship to each other, and a multiplicity of bridging segments of strip form, said segments being individually and removably attached lengthwise to said support members axially of the latter and in closely adjacent parallel relationship to each other, said segments being arranged in stepped relationship to each other, and certain of the same being adapted to overlap the plane of the adjacent end portions of said support members.

13. In a control drum for an alternating current motor having a polyphase rotor, the combination with a multiplicity of contact fingers, of a multiplicity of contact segments so disposed with respect to the contact fingers that the path of current flow between all active contact fingers in any given operative position of the drum is substantially wholly through one of said contact segments.

RICHARD B. HUNTER.